United States Patent [19]
Beech

[11] Patent Number: 5,713,486
[45] Date of Patent: Feb. 3, 1998

[54] QUICK-CHARGE AND-DISCHARGE DISPENSING SYSTEM FOR LIQUID INDIRECTLY WEIGHED IN A DISPENSER

[75] Inventor: Walter Lee Beech, Chardon, Ohio

[73] Assignee: MBT Holding AG, Zurich, Switzerland

[21] Appl. No.: 654,136

[22] Filed: May 28, 1996

[51] Int. Cl.$^6$ .................................................. G01F 11/00
[52] U.S. Cl. .................... 222/1; 222/14; 222/61; 222/77
[58] Field of Search .................... 222/14, 61, 77, 222/155, 394

[56] References Cited

U.S. PATENT DOCUMENTS

| | | | |
|---|---|---|---|
| 4,013,194 | 3/1977 | Moscarini et al. | 222/23 |
| 4,244,218 | 1/1981 | Wohrl | 73/309 |
| 4,320,775 | 3/1982 | Stirling et al. | 137/3 |
| 4,804,111 | 2/1989 | Ricciardi et al. | 222/77 |
| 5,197,633 | 3/1993 | Hines et al. | 222/14 |
| 5,568,882 | 10/1996 | Takacs | 222/61 |

*Primary Examiner*—Joseph Kaufman
*Attorney, Agent, or Firm*—Renner, Kenner, Greive, Bobak, Taylor & Weber

[57] ABSTRACT

A desired amount of liquid ("unit dose") to be dispensed from a stationary dispenser is automatically, accurately controlled by suddenly interrupting the flow of liquid being dispensed after a major portion of the unit dose has been dispensed. A portion of the lost momentum is restored and discharge of the unit dose is completed. Pressurized inert gas is used to speed up dispensing the unit dose to meet a fill-and-discharge cycle time of <2 min, preferably <1 min. The unit dose is dispensed with better than ±5% accuracy, preferably at least ±3%, without measuring either the level or the volume of the liquid in the dispenser, or directly measuring the weight of liquid dispensed. More than the desired amount of liquid to be dispensed is held in the dispenser which is charged under pressure in the range from 380-790 kPa (40 to 100 psig), at too high a velocity to establish a stable level. The velocity of the liquid through quick-opening and quick-closing inlet and outlet valves introduces a variable which is more disruptive of accuracy than any random variation of its specific gravity, or the pressure within the dispenser. The liquid is therefore indirectly weighed, both into, and out of the dispenser by sensing the force exerted on a load cell by an elongated body having a constant cross-sectional area immersed in the liquid. A preset force corresponding to a desired loss of weight, provides an analog output signal to a controller which generates an output signal to interrupt the flow of liquid from the dispenser. The flow is re-stored within less than 1 sec, preferably less than 0.5 sec, and the discharge of the desired amount of liquid is completed under pressure.

18 Claims, 6 Drawing Sheets

5,713,486

QUICK-CHARGE AND-DISCHARGE DISPENSING SYSTEM FOR LIQUID INDIRECTLY WEIGHED IN A DISPENSER

BACKGROUND OF THE INVENTION

This invention relates to a batch-wise dispensing system for charging liquid into a dispenser, then accurately controlling the discharge of a desired amount of the liquid, referred to herein as a "unit dose", within a short time for the fill-and-discharge cycle, referred to as "cycle time". In addition, it is required that the unit dose be dispensed with critical accuracy of at least ±5 percent, preferably at least ±3 percent.

The invention specifically relates to a system for dispensing a unit dose of liquid into a mixture of a receiving material in which the amount of liquid is critical. Though a single liquid may be dispensed, in a typical application, plural reaction-modifying liquid reagents are added, separately and usually sequentially, into a batch of wet concrete about to be transported to a location where it is to be used. Recognizing that wet concrete commences to "set up" as soon as it is mixed, each liquid reagent of the mixture is charged to a dispenser, then discharged to a truck carrying the concrete, within a short cycle time of about 2 min or less. Usually, the amount of liquid in a unit dose varies from less than 1 liter (1 L) to more than 100 L; the "cycle time" is less than 2 min (minutes), preferably less than 1 min; and the allotted time for the discharge portion of the fill-and-discharge cycle is less than 1 min; preferably less than 45 sec.

The short cycle time requires that liquid be charged and a critically controlled amount of the unit dose be discharged, both at a high flow rate which results in a highly unstable level within the dispenser. The prior art relying on measuring level, failed to recognize that a stable level was not required to dispense a unit dose; nor does the art suggest that accuracy could be achieved in a short cycle time, without measuring the level of the liquid, or the volume it occupies in the dispenser, by indirectly sensing the apparent weight of liquid displaced by an elongated body, referred to herein as a "plunger", partially immersed in the liquid. In U.S. Pat. No. 4,320,775 to Stirling et al, accuracy of the amount of liquid dispensed could only be maintained when the liquid was dispensed at a low flow rate. This was done by compensating for the head of liquid in the dispenser by automatically adjusting a flow control valve to provide a lower rate of flow for a brief period of time at the beginning of each discharge. As the head of liquid decreases, the flow control valve is gradually opened, thereby eliminating any fluctuation in the flow rate due to the varying liquid head. The difficulty of indirectly sensing the weight of liquid to be dispensed, then dispensing the desired amount without proportioning valves, while maintaining critical accuracy of ±5 percent or better, and meeting the stated time requirement of less than 1 min for the cycle, has not been addressed in the prior art. Specifically in the field of mixing a batch of wet or dry concrete, the art provides no suggestion as to how to charge and then dispense as much as about 113 L (liters) of a liquid reaction-modifying reagent within less than 2 min, preferably less than 1 min, automatically, yet maintain the desired accuracy.

To charge and then dispense a unit dose so quickly and accurately presents a problem which is exaggerated when it entails controlling the charging of a relatively small amount of liquid to the dispenser, then discharging that amount. This is particularly true if a "single unit dose" is to be dispensed, and the dispenser then re-filled from a supply reservoir. The term "single unit dose" refers to the desired amount of liquid being discharged from the dispenser which is then re-charged with enough liquid to discharge another single unit dose. To avoid a time penalty for charging liquid after each discharge, and to maximize the time available for the discharge portion of the cycle, multiple doses, from 2 to 10, but typically no more than about six, may be charged to the dispenser during a single charging period, and only unit doses dispensed. In normal operation, a batch of concrete, say 7.65 m$^3$ (10 yd$^3$ cubic yards), is charged into a truck at a dispensing station provided with multiple dispensers, each with a specific reaction-modifying liquid reagent which is to be added in accordance with a recipe. Such liquids may include an accelerator or retarder to modify the "set up" time, water reducer, evaporation retardant, corrosion inhibitor, air entrainer, freezing point modifiers and the like. If the truck travels to successive dispensing stations, the more individual reagents to be added, the longer is the total elapsed time until the truck can depart for a "pour".

Whether a single unit dose, or multiple unit doses are to be dispensed, only a relatively small amount of liquid is to be held in each dispenser. If only a single unit dose is to be dispensed, the desired relatively small amount of liquid is in the range from about one-third (0.3 L) liter or 10 fluid ounces (fl.oz US), to about 113 liters (113 L) or 30 gal, so that the dispenser has a relatively small liquid capacity, that is, it is a small dispenser, typically less than 190 L (50 gal). If desired, a larger dispenser having a capacity for more than about six unit doses may be used, but the problem of dispensing a small unit dose accurately from a much larger volume of liquid in the dispenser, is magnified. Therefore, in the art of mixing concrete, and in analogous arts where corresponding considerations prevail, no more than six, and most typically only a single unit dose, is dispensed from each dispenser which, in turn, is supplied from a large supply reservoir containing several hundred unit doses, or more.

Conventional systems are available for dispensing a desired amount of liquid from a dispenser. Commonly, for example, a dispenser may be weighed before and after delivery of the desired amount of liquid. Many prior art systems are provided with means to sense the level, volume or weight of liquid within the dispenser, and to operate control means for discharging the desired amount. Alternatively, a specified amount of liquid may be discharged from a dispenser, typically by opening an outlet valve which measures mass flow of the liquid through it, then closing the valve when the desired amount has flowed through it. Small amounts of liquid are most commonly dispensed from a dispenser having a sight glass in which the level of liquid indicates the amount of liquid remaining in the dispenser. By difference from the prior level before liquid was dispensed, the amount dispensed is determined.

Numerous types of flow meters are available to measure the level of the liquid as it enters the dispenser (see "*Choose the Right Flow Meter*" by John W. Dolenc, Chemical Engineering Progress, January 1996). However, to obtain the desired accuracy within the preset constraint of time, when the viscosity of the liquid is not constant, a choice of a suitable available flow meter was ruled out either because of high cost or high maintenance, or both. It was therefore decided to find a different system and method for measuring the desired amount of liquid to be charged, then dispensed. Because weighing the liquid and the dispenser together, introduced an unacceptable degree of inaccuracy, it was decided to weigh only the unit dose to be dispensed.

However, it was decided to weigh the unit dose only indirectly, without directly weighing either the liquid or the dispenser, using the Archimedean principle.

Since the buoyancy of a solid is the product of the volume of the solid and specific gravity of the liquid in which the solid is immersed, if the specific gravity of the liquid is essentially constant, then a change in volume is directly proportional to buoyancy. Thus the change in sensed weight of the immersed solid can provide the weight of the liquid in which it is immersed, provided the volume of the dispenser is fixed. A straight line relationship is obtained when the solid is an elongated body, or "plunger", having a constant cross-sectional area in the horizontal plane, and the cross-section of the dispenser is also constant. The foregoing data are used to perform computations to determine accurately the weight of the liquid discharged from the dispenser.

The foregoing indirect determination of weight of liquid in the dispenser is independent of the level of the liquid in the dispenser, which level fluctuates violently because the liquid is charged at high velocity under superatmospheric up to about 10 bar; and also independent of whether the liquid foams, as it usually does under high-velocity conditions. Moreover, to meet the required short cycle time, liquid is charged and discharged under pressure and the rate at which the liquid enters and/or leaves the dispenser causes a fluctuation in level which, if it had to be measured, would make it very difficult to maintain the critical accuracy.

Though quick-acting valves which are either fully-opened or fully-closed, are commercially available, there is no suggestion that they be used in a dispensing system where the amount of liquid to be dispensed is critical. Such valves have no proportioning capability. Despite the short time, less than 1 sec, preferably less than 0.5 sec, during which such a valve can be fully opened or shut, it is evident that under superatmospheric pressure, the amount of liquid which flows through the valve during the short time while it is closing, adversely affects the accuracy with which a small unit dose, less than 190 liters, and as small as 0.5 liter, can be dispensed. However, there is no suggestion in the prior art, that, the use of quick-acting inlet and outlet valves to charge and discharge the liquid to and from the dispenser, respectively, that the required accuracy of ±5% or better can be met by suddenly interrupting the momentum of the mass of liquid being discharged from the dispenser during a critical time interval, namely after a major portion (>50%) of the unit dose, has been dispensed. By "suddenly interrupting the momentum" is meant that the velocity of the remaining mass of a unit dose in the dispenser is at least halved within less than 1 sec, either by shutting off presurizing gas to the dispenser, or shutting off flow of liquid from the dispenser, or both. The time during which the momentum is interrupted is not narrowly critical but is preferably less than 1 sec since a longer time serves no useful purpose. Preferably, momentum is interrupted near the end of the discharge portion of the cycle, before the entire unit dose is dispensed, then restoring a portion of the lost momentum of the remaining liquid at the time of interruption, until the load cell senses that 100% of the unit dose has been dispensed.

SUMMARY OF THE INVENTION

It has been discovered that irrespective of conditions under which a liquid is supplied from a supply reservoir to a dispenser, and of physical characteristics of the liquid, the weight of liquid to be dispensed with critical accuracy within a preset period, may be accurately controlled by a controller means (also referred to as a "signal processing means") which transmits signals requiring the momentum of the mass of liquid flowing through the dispenser to be interrupted suddenly, preferably just prior to the desired amount of liquid ("unit dose") being dispensed.

Specifically, a "fill cycle" (the charging portion of the cycle) comprises charging liquid (to be dispensed) into the dispenser, typically by opening a liquid inlet valve means for incoming liquid, then closing the valve when the amount of liquid in the dispenser corresponds to a predetermined reference point in relation to the force exerted by a plunger immersed in the liquid. This point is referred to as the "charge" reference point. Upon the fill cycle being completed, the discharge portion of the cycle is commenced. The discharge portion of the cycle ends when the sensed weight of a unit dose discharged corresponds to a predetermined reference point, referred to as the "zero" reference point in relation to the force exerted by a plunger immersed in the liquid at that time. A controller means is appropriately instructed to recognize the "charge" point and "zero" reference points, whether the zero reference point is set for a single unit dose, or for multiple unit doses. In each case, a unit dose dispensed is then sensed in relation to the zero reference point for a unit dose.

In a first specific embodiment, momentum is interrupted after a major portion, preferably more than 80% of the unit dose, is discharged from the dispenser under inert gas pressure. Pressurizing gas, essentially unreactive with the liquid, is flowed to the dispenser through a quick-acting solenoid air inlet valve. While liquid is being discharged through an open liquid outlet valve, the air inlet valve is quickly closed within less than 1 sec, held closed for a preselected period and then re-opened, preferably within within less than 1 sec, while the discharge of a unit dose is completed, that is, until the outlet valve is closed. Closing the air inlet valve in an air line which supplies pressurized air thus interrupts the momentum of the liquid for a preselected period, and unexpectedly provides the required critical accuracy of weight of dispensed liquid.

In a second specific embodiment, after 80% of a unit dose is dispensed, the gas inlet valve is held open to maintain pressure, but the outlet valve is quickly closed within less than 1 sec, held closed for a preselected period and then re-opened, preferably within within less than 1 sec, until the remaining portion of the unit dose is dispensed and the outlet valve is closed.

In a third specific embodiment, after the outlet valve is opened to discharge a unit dose, and after more than 80% of a unit dose is dispensed, pressurizing air is cut off by de-energizing the solenoid for the air inlet valve; essentially simultaneously, the liquid outlet valve is closed, both within less than 1 sec. After a short preselected period, preferably less than 1 sec, the solenoid is then re-energized and the air inlet valve is opened; essentially simultaneously, the outlet valve is opened. The outlet valve is again closed after the load cell senses that the unit dose has been dispensed.

It is therefore a general object of this invention to provide a dispenser which traps more liquid than is to be discharged under pressure of gas above the liquid, the liquid entering through a quick-opening and quick-closing inlet valve and leaving through a quick-opening and quick-closing outlet valve, each valve opening and closing in less than 1 sec, preferably less than 0.5 sec. Air under pressure is supplied through an air line with a quick-acting valve. A controller means is programmed to transmit signals to initiate opening or closing each valve. For a visual check of the level of liquid in the dispenser a vertical sight glass is provided.

It is a specific object of this invention to provide a dispenser which uses pressurized gas to fill the space above the trapped liquid and forcefully discharge a unit dose from the dispenser within the discharge period of a fill-and-discharge cycle limited to 2 min, and preferably 1 min, under a pressure in the range from about 2.7 bar (about 25 psig) to 5 bar (about 75 psig). The discharge portion of the cycle is preferably less than 1 min, more preferably less than about 45 seconds.

It is also a specific object of this invention to provide a dispenser which has an internal volume in the range from about 2 to 10 times greater than the volume of the desired amount of liquid to be discharged; and, to provide a dispenser for which the ratio of its internal cross-sectional area relative to that of the plunger is in the range from about 3 to 20.

It has also been discovered that a load cell adapted to output an analog signal through an appropriate amplifier in response to a force exerted directly beneath the load cell by the suspended plunger, unexpectedly results in being able to process the signal through a concrete batching controller means, about four times as fast as by switching voltage. The controller means transmits signals to open and close quick-acting valves to interrupt momentum of a unit dose suddenly, just before the unit dose is discharged, to deliver the unit dose with stated accuracy and within a preselected short period.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

In each of the embodiments described below, a unit dose is indirectly determined with surprising accuracy, using a load cell from which is directly suspended a plunger having a higher specific gravity than that of the liquid. The high flow rate of liquid into the dispenser, under high pressure and at high velocity, results in the plunger being moved randomly, swinging in the incoming liquid. The accuracy of the measurement of sensed weight of the plunger is attributable to the availability of an appropriate load cell with adequate resolution, and construction of an appropriate amplifier means for the load cell, and (ii) providing a signal processing means referred to generally as a "controller means", to instruct quick-acting valves when to open and close. Appropriate instructions from the computer ensure that excess liquid which would be dispensed during the inherent lag time of the outlet valve (required time to fully close) after the valve has received a signal to close, does not flow through the valve. By providing a short time, from at least 0.1 sec up to less than 1 sec, during which the momentum of the liquid mass being discharged is interrupted after a major portion of a unit dose has been discharged, flow of the excess liquid is negated. The precise amount of time in the given range is not critical.

In particular, a unit dose of reaction-modifying reagent for a wet concrete mix is dispensed into a batch of wet concrete mix having a volume in the range from about 0.765 $m^3$ (cubic meters) or 1 $yd^3$ (cubic yards) to about 11.47 $m^3$ or 15 $yd^3$, just before the concrete mixture is used. The system described herein is equally applicable to dispense a small amount of any other liquid accurately into a larger mass of material where analogous considerations of accuracy and time prevail.

Figure 1:
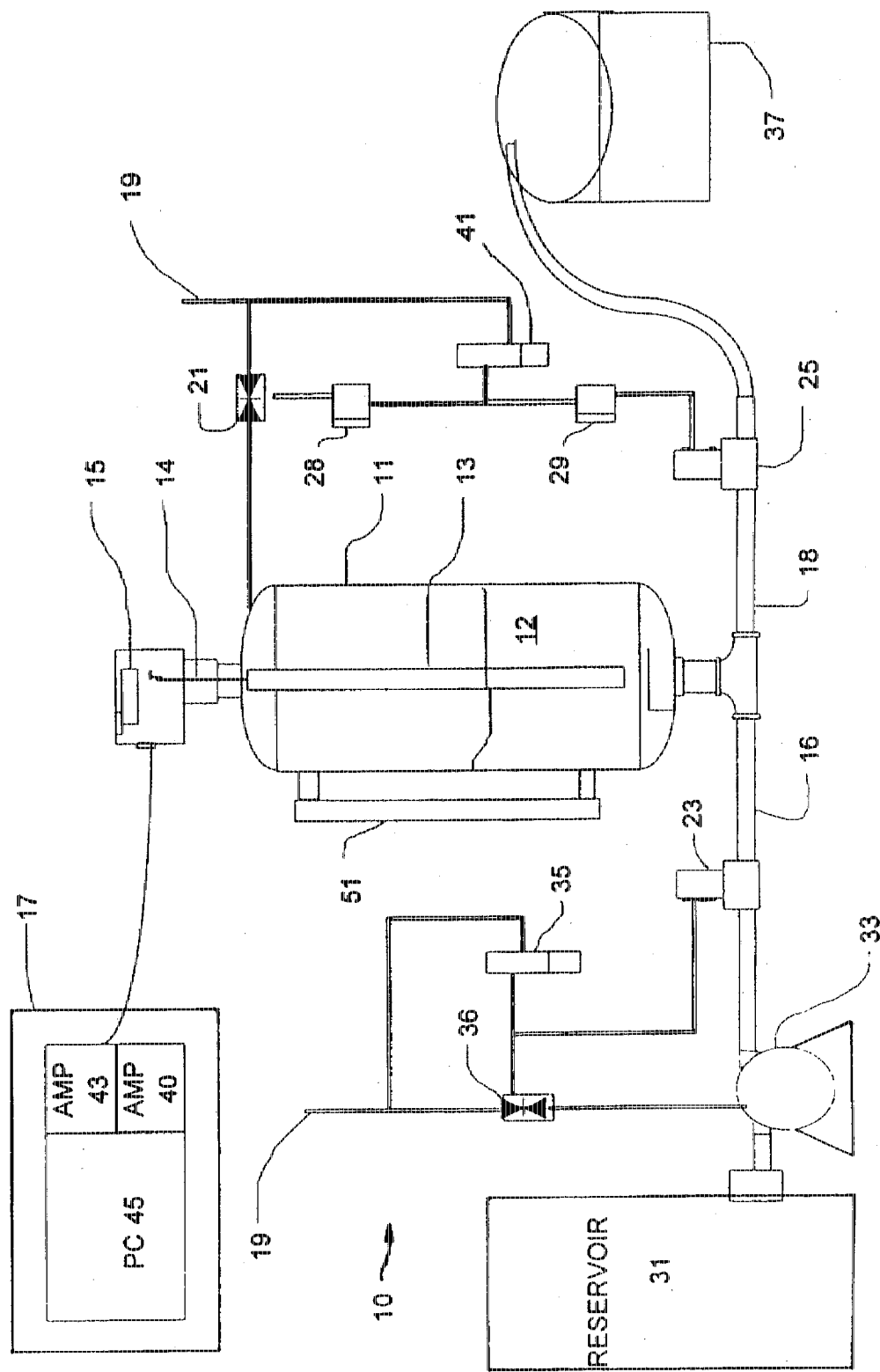
FIG. 1 schematically illustrates the main components of a dispensing system for a desired amount of liquid additive to be rapidly charged and discharged accurately from a dispenser into a wet batch of concrete mix held in a concrete truck.

Referring to FIG. 1 there is illustrated a dispensing system referred to generally by reference numeral 10, which includes a dispenser 11 into which a liquid 12 is charged, a plunger 13 suspended vertically so that it is partially immersed until a desired weight of liquid is charged. At least a portion of the buoyant plunger 13 is immersed at all times, even after the desired amount of liquid is discharged from the dispenser. The liquid has a specific gravity in the range from about 0.6 to about 1.3 and typically is viscous with a propensity to foam when charged into a dispenser at a velocity in excess of about 1.5 m/sec (5 ft/sec). The liquid is most preferably charged at a velocity in the range from about 1.5 m/sec (5 ft/sec) to about 15 m/sec (50 ft/sec) to obtain a quick fill of the dispenser. The plunger 13 is connected by a substantially rigid rod 14 to a load cell and strain gauge 15 with swivels (not shown) which allow the plunger to swing as well as rotate. It was found that the accuracy of the load cell suffered when the plunger is precluded from rotating through at least 90°. The load cell and associated strain gauge measures the decrease in strain exerted by the plunger 13 as liquid 12 is charged through conduit 16 which is connected in open fluid communication with the dispenser 11. The space above the surface of the liquid in the dispenser is pressurized by air from an air supply 19, such as an air cylinder, connected to deliver pressurizing air to the dispenser 11 through a conduit (an "air line") having a quick-acting valve 21 for inlet air. Though any other type of quick-acting valve may be used, most preferred is an air pilot valve of the poppet series such as one commercially available from Automatic Valve Co. The pressurizing air supply is typically available at superatmospheric pressure, preferably in the range from 2 to 6 bar.

Liquid is supplied from a supply reservoir 31 by a pump means, preferably an air-diaphragm pump 33 at a pressure in the range from about 380 kPa (40 psig) to about 790 kPa (100 psig), through the charging conduit 16 having a quick-opening and quick-closing inlet valve 23, into the bottom portion of the dispenser 11. Though any quick-acting liquid inlet valve may be used, most preferred is a pneumatically operated liquid control valve such as a miniature air operated diaphragm valve, Series BSD available from Plast-O-Matic Valves Inc.. Liquid to be discharged from the dispenser leaves through discharging conduit 18 having a quick-opening and quick-closing outlet valve 25, and thence into a mixing receptacle 37 such as a concrete track in which the discharged liquid is to be mixed with other ingredients. For the purpose of checking the level of the liquid 12 visually in the dispenser 11, it is provided with a sight glass or sight robe 51. Most preferred is an outlet valve which is a miniature air operated diaphragm valve similar to one used for the liquid inlet valve which can open or close in 0.1 sec.

The load cell and strain gauge 15 are programmed to react when it senses weight at the "charge", "pre-zero" and "zero" reference points. The load cell generates analog signals which are processed by a signal processing means 17 which selectively communicates with quick-opening and quick-closing valves air pilot valve 36 and diaphragm inlet valve 23, in the charge cycle, and with air pilot valve 21, and diaphragm outlet valve 25 in the discharge cycle. In the specific illustration herein signal means 17 includes a computer means 45 and amplifier means 40 and 43 for reasons given herebelow; and, air-actuated valves are used. Solenoid air pilot valve 41 actuates air poppet valve 21 and diaphragm outlet valve 25. Solenoid valves 28 and 29 are positioned between solenoid air pilot valve 41 and the valves 21 and 25 respectively, to allow valves 21 and 25 to be closed independently. Valves 28 and 29 are therefore referred to as "intermediate" valves.

The cross-sectional areas of dispenser 11 and plunger 13 are chosen relative to the amount of liquid to be weighed so that the accuracy of measurement is at least ±3 percent. The weight of the plunger is adjusted so that its specific gravity is in the range from about 10% to 100% greater than that of the liquid, typically from 1.1 to about 2 for an aqueous liquid. It will be evident that higher specific gravities may be used, though with a concomitant decrease in accuracy of weight of liquid charged and discharged. The specific gravity of the plunger and its total weight is chosen in relation to the velocity of liquid to be charged, the total weight permitting the plunger to swing freely in the liquid as it is being charged, without significantly affecting the sensitivity of the load cell to the weight of liquid charged. The dispenser typically has an internal volume in the range from about 2 to 10 times greater than the volume of the desired amount of liquid to be discharged; and, the ratio of the internal cross-sectional area of the dispenser relative to that of the plunger is in the range from about 3 to 20.

Figure 2:
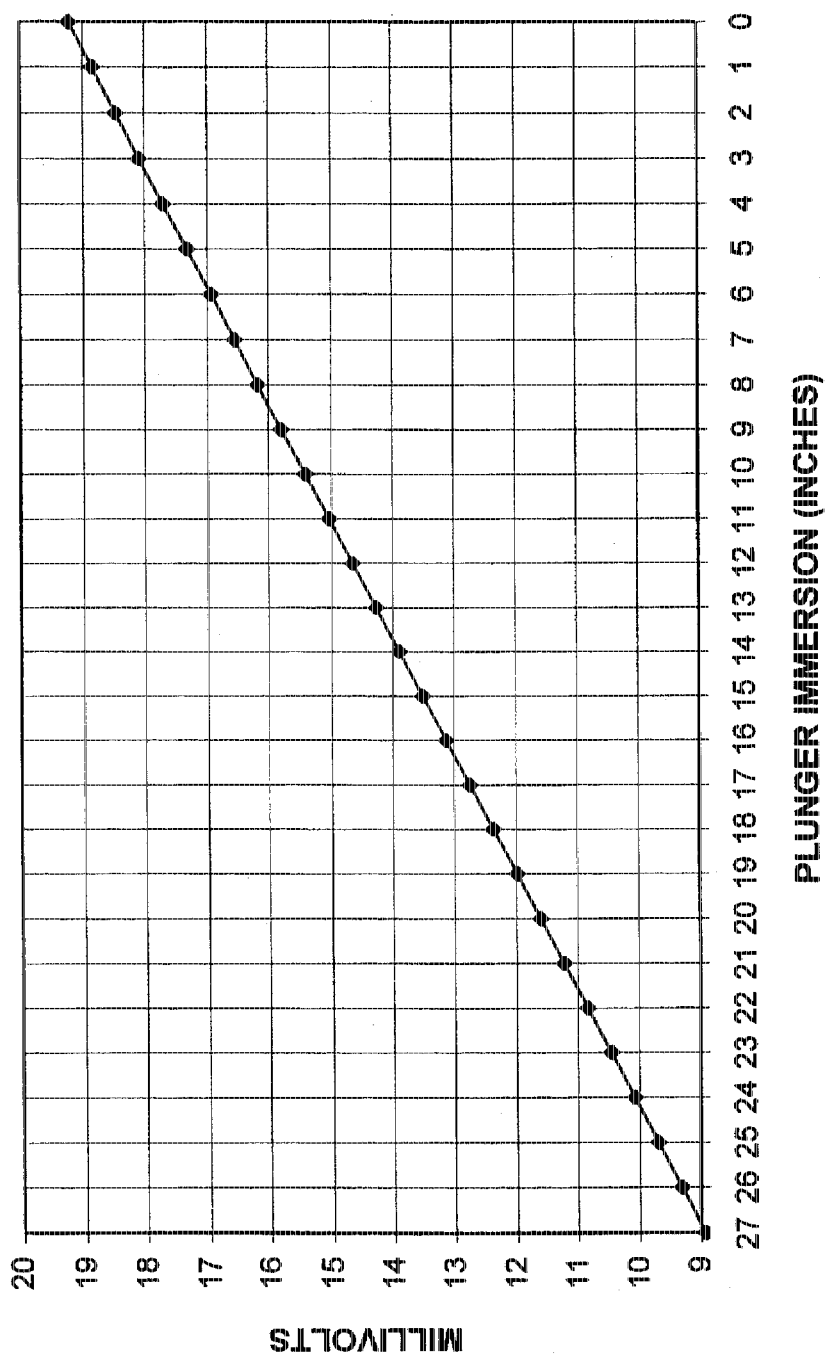
FIG. 2 is a graph plotting the amount of liquid displaced as a function of depth of immersion of the plunger, wherein the dispenser and the elongated body each have a circular cross section of a right cylinder, indicating that the weight of liquid displaced is directly proportional to the depth of immersion of the body.

FIG. 2 is a plot of the magnitude of the output signal (millivolts) of the load cell versus the immersed length of plunger (inches) for a specific cylindrical dispenser having an internal volume of about 30890 $cm^3$ (1885 $in^3$) fitted with a cylindrical plunger about 68.6 cm (27 in) long, having an outside diameter of about 4.11 cm (1.62 in) and weighing about 1.9 Kg (4.2 lb) (used in the example provided below). It is evident that the relationship between the output signal and the depth to which the plunger is immersed, is linear. This information is processed to provide the amount of liquid in the dispenser, and by difference, the amount of liquid dispensed.

Figure 3:
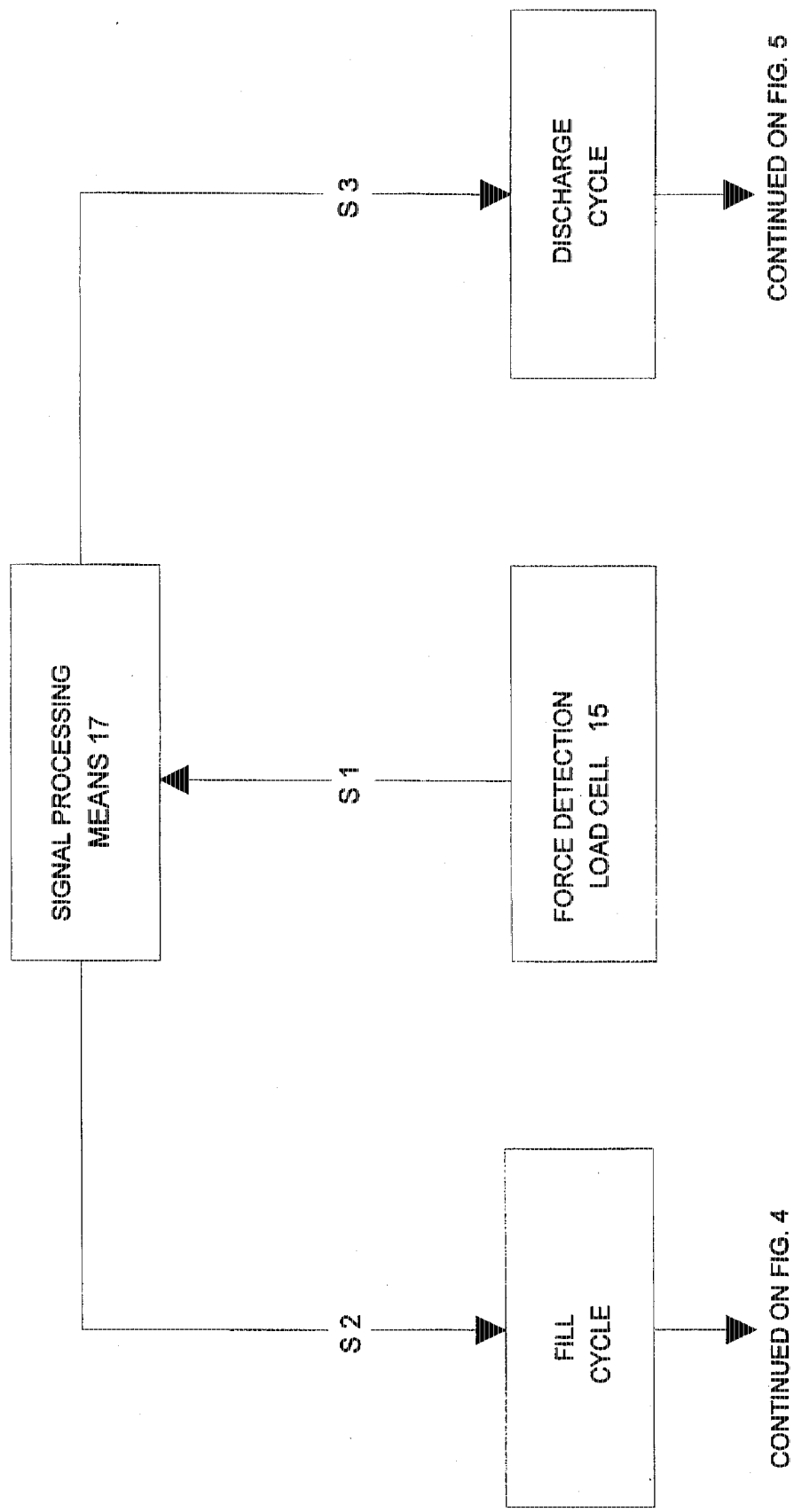
FIG. 3 is a simplified functional flowsheet of an analog circuit showing the main components and functions of the signal processing means.

Referring to FIGS. 1 and 3, there is shown a schematic flowsheet to illustrate the overall functional interaction of the main components of the system. Load cell 15 senses a reference point and transmits a signal S1 to the signal processing means 17 which may be any controller means such as a programmable logic controller (PLC), but is most preferably a personal computer (PC) specifically programmed for the purpose at hand, and therefore referred to as a "dedicated PC". A charge cycle is initiated with signal S2. Upon the fill-level being reached, as sensed by the load cell 15, the liquid is held in the dispenser until the signal processing means initiates the discharge cycle with signal S3.

Figure 4:
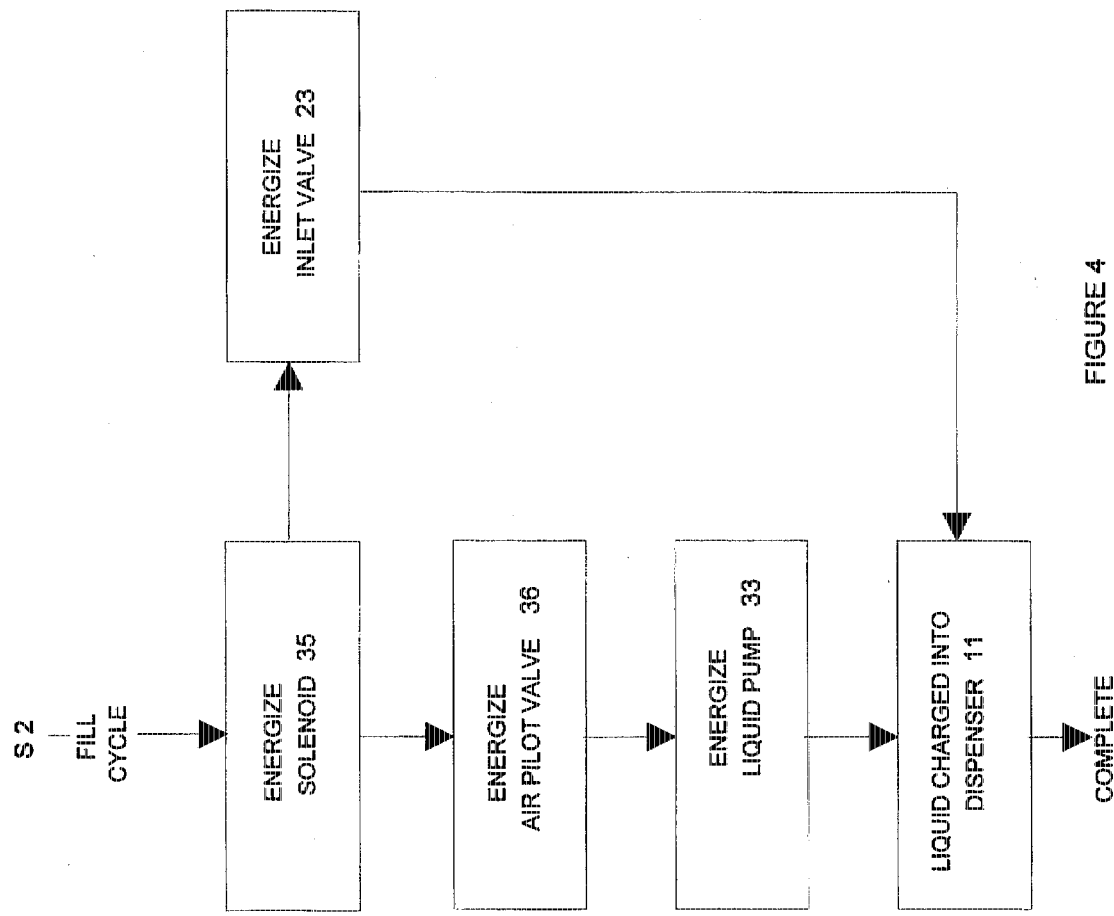
FIG. 4 is a functional flowsheet showing the components of the system relative to their corresponding function, connected in an analog circuit showing the steps in the "fill cycle" during which liquid is charged to the dispenser, the function of the components being described in relation to FIG. 1.

Referring to FIGS. 1 and 4, signal S2 energizes solenoid valve 35 which operates air poppet valve 36 and essentially simultaneously opens liquid inlet valve 23. When air pilot valve 36 opens, it also opens the main air supply for the diaphragm pump 33. Liquid 12 enters dispenser 11 and continuously generates a signal S1 until the plunger 13 is immersed to a preselected "fill-weight" corresponding to a "charge" reference point. This fill-weight provides a first reference signal at the desired sensed weight. Only the upper portion of the plunger is not immersed. At the fill-weight, more liquid is held in the dispenser than is to be dispensed. The pump 33 is shut off by cutting off the signal S2 to air pilot valve 35. Cutting off S2 also closes inlet valve 23.

Figure 5:
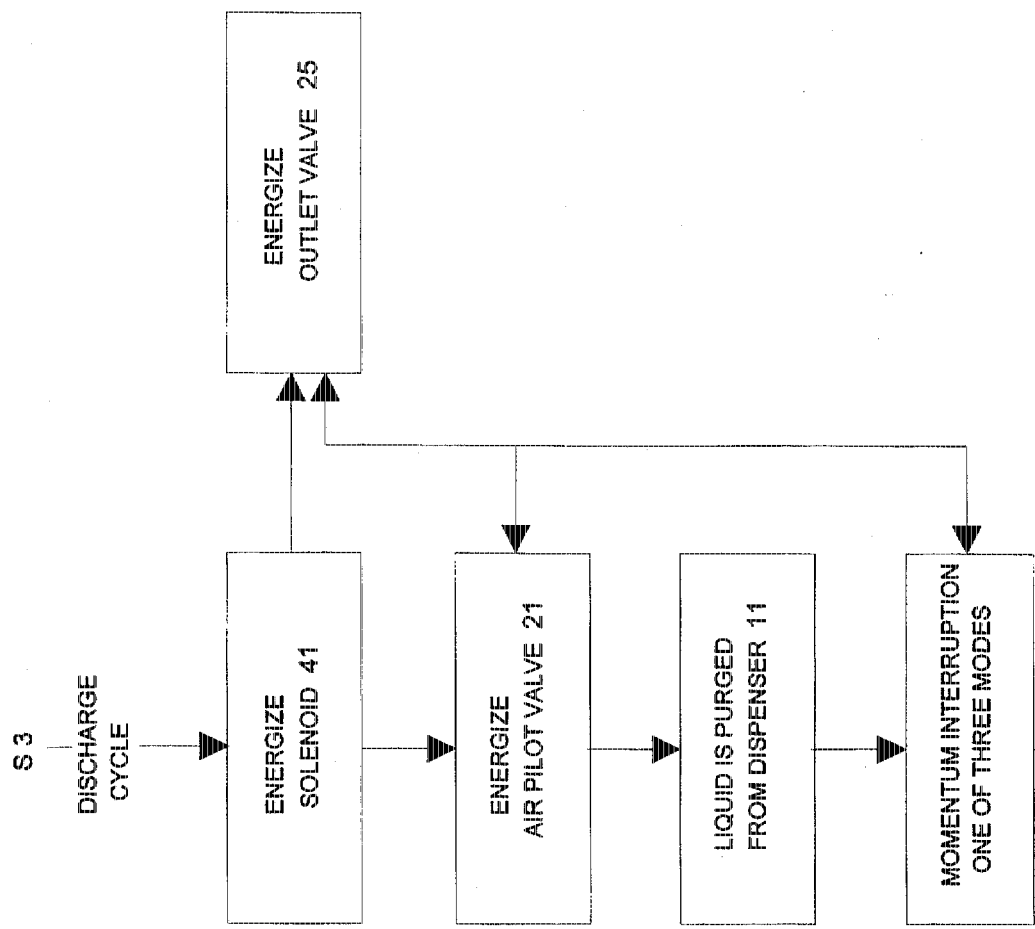
FIG. 5 is a functional flowsheet showing the components of the system relative to their corresponding function, connected in an analog circuit showing the steps in the "discharge cycle" during which liquid is discharged from the dispenser, the function of the components being described in relation to FIG. 1.

Referring to FIGS. 1 and 5, in the discharge cycle wherein the third embodiment of interruption is used, a signal S3 is sent to solenoid air pilot valve 41 which operates outlet valve 25, and simultaneously inlet air pilot valve 21 is opened to pressurize the dispenser and discharge the liquid. Intermediate valves 28 and 29 remain open. Details for this embodiment as well as the first and second, after signal S3 initiates the discharge cycle, are described in FIG. 6.

Since the ratio of the horizontal cross-sectional area of the plunger to that of the dispenser is constant, and the specific gravity of the plunger is greater than that of the liquid, the weight of the liquid charged into the dispenser is computed.

From the foregoing description it will now be evident that the batch-wise dispensing system for quickly charging, then discharging a liquid having essentially constant specific gravity from one batch to the next, comprises, a supply reservoir adapted to contain the liquid; a dispenser adapted to hold more liquid from the supply reservoir than is to be dispensed in a single unit dose, the liquid to be charged at a sufficiently high pressure and velocity to produce an unstable non-level surface of accumulating liquid within the dispenser; pump means in selectively open fluid communication between the supply reservoir and the dispenser; an elongated plunger adapted to be pendently immersed lengthwise within the liquid charged, to a depth less than the plunger's length measured vertically, and simultaneously to have the plunger's lower end in spaced apart relationship with the dispenser's bottom; essentially inextensible means attached to the plunger which is freely swingable from the load cell and rotatable on the rod means in response to forces exerted by incoming liquid; a hermetically sealed load cell disposed within the dispenser, and connected to the inextensible means; quick-acting liquid inlet valve means in selectively open fluid-communication between the reservoir and dispenser; quick-acting liquid outlet valve means in selective fluid-communication between the dispenser and a discharge outlet; quick-acting air inlet valve means in selectively open fluid-communication with the dispenser, to provide air at a pressure in the range from about 2 bar to 5 bar; and, controller means responsive to output signals from the load cell and programmed to signal actuation of the pump, to stop the pump, and to open and close the air inlet valve and the liquid inlet and outlet valves.

The load cell is adapted to measure a force exerted by the plunger, and to generate a continuous analog output signal which varies in response to forces corresponding to the charge, pre-zero and zero reference points, respectively, the force corresponding to the charge reference point being less than the force corresponding to the pre-zero reference point, which in turn is less than the force corresponding to the zero reference point; the controller means is responsive to the output signals corresponding to the charge, zero and pre-zero reference points to generate corresponding computer signals to commence discharging liquid from the dispenser, to interrupt the momentum of the liquid mass in the dispenser and subsequently to re-charge the dispenser. Depending which mode of interruption is chosen, either the air inlet valve means, or the liquid outlet valve means, or both are responsive to a computer signal received when the pre-zero reference point is sensed, which signal closes either valve, or both. In each mode, liquid is charged and the unit dose ±3 percent is dispensed within less than 1 min, without measuring the level or the volume of liquid contained in the dispenser, or directly weighing the liquid dispensed therefrom.

The load cell is calibrated for a desired range of weights of liquid to be charged and discharged from the dispenser 11. For reaction-modifying liquids to be added to concrete, as little as 3.7 ml (0.125 fl.oz.) per sack of cement may be required to be dispensed in a batch of concrete which may contain as little as 5 sacks of cement (about 227 Kg or 500 lb) so that the unit dose will be 18.5 ml (0.625 fl.oz.). On the other hand, as much as 5.9 L (about 200 fl.oz.) of accelerator may be required in 1 sack of cement, and for a 15 yd$^3$ batch of 6-sack concrete, as much as 530 L (18000 fl.oz. or 140 gal) is discharged in about 45 sec. To obtain the desired accuracy of measurement within a preset time, the dimensions of the dispenser and plunger (cross-sections) are chosen so that the desired unit dose can be discharged with ±3% accuracy within 30 sec.

The dimensions of the dispenser and the plunger are chosen depending upon the amount of liquid to be dispensed. In a typical concrete plant several dispensers are used, each for a specific liquid. Thus to discharge liquid in an amount in the range from about 18.5 ml (0.625 fl.oz)/sack to 1.5 L (50 fl.oz.)/sack, with ±3% accuracy, a dispenser preferably has a cross-sectional area in the range from 176 cm$^2$ (27.3 in$^2$) to about 761 cm$^2$ (113 in$^2$) and is fitted with a plunger having a cross-sectional area in the range from about 15.5 cm$^2$ (2.4 in$^2$) to about 39 cm$^2$ (6 in$^2$). This allows a unit dose, up to about 5 Kg (11 lb), to be both charged and discharged from the dispenser with no less than the stated accuracy within a fill-and-discharge cycle time from about 15 sec to about 50 sec.

Reverting to FIGS. 1 and 3, illustrating the specific system used herein with pneumatic valves most preferred in the field, computer means 17 includes first and second output signal amplifier means 40, 43 respectively, and a programmable computer "PC" 45. Signal S1 is simultaneously transmitted to the amplifiers 40 and 43. Amplifier 40 sends a signal S4 (not shown) to the PC 45 which generates two output signals S2 and S3, for the fill and discharge cycles respectively. Amplifier 43 transmits a signal S5 (not shown) which actuates valve means to interrupt the momentum of liquid being discharged.

Output signal S2 from PC 45 energizes an electrically controlled solenoid air control valve 35 which preferably has a manual override. Pilot air released from the air control valve 35 simultaneously actuates (opens) a quick-acting and closing air control pilot valve 36, and also actuates (opens) liquid inlet diaphragm valve 23. The valve 36 may be a direct operating solenoid valve, but more preferably, is an air pilot valve of the poppet series (also referred to as an "air poppet valve"), commercially available from Automatic Valve Co. Pilot air functions to open or close the source of main air supply being fed to the air diaphragm pump. Pilot air released from air poppet valve 36, in turn, actuates (starts) diaphragm pump 33. Alternatively, the fill output signal S2 could simultaneously actuate any other pump means for example, the electric motor for a centrifugal pump, and the inlet valve 23 using electric current; or, signal S2 could actuate hydraulic means to actuate the pump 33 and the inlet valve 23. The fill cycle is thus completed.

Before the discharge cycle is initiated, S2 actuates (closes) solenoid 35 and air poppet valve 36 is de-energized shutting down the pump 33, and the inlet valve 23 is closed.

Upon commencing the discharge cycle, outlet valve 25 is opened and liquid 12 is discharged until the PC 45 turns off signal S3, which in turn closes the outlet valve 25.

Reverting to FIGS. 1 and 6, a first embodiment for interrupting momentum is as follows: When the load cell 15 senses the preset pre-zero reference point, valves 25 and 21 are in the open position, being held open by signal S3. Also open are the intermediate air valves 28 and 29 which are always open until instructed to close. Signal S3 keeps valves 25 and 21 open by instructing air pilot solenoid valve 41 to provide air to open each. In the particular embodiment illustrated, the output signal to air pilot valve 41 is generated in amplifier 43 because the PC 45 is not programmed to provide the output signal. Preferably the controller means is programmed to provide the signal so as to avoid using the amplifier. When a preset force is exerted by the plunger at the pre-zero reference point, S3 maintains valve 25 open, and a signal S4 generated by the internal relay in amplifier 43 momentarily energizes the solenoid in normally open air pilot valve 28, closing it. After about 0.5 sec, signal S4 is shut off, and de-energizes the solenoid in valve 28, thus opening air inlet valve 21. The period between energizing and de-energizing the solenoid is in the range from 0.1 sec but less than 1 sec.

A second embodiment for interrupting momentum is as follows: As in embodiment one, when the load cell 15 senses the preset pre-zero reference point, valves 25 and 21 are in the open position, as are intermediate air valves 28 and 29. The programmed controller means (to avoid the amplifier) provides a signal S4 which energizes the normally open solenoid in air pilot valve 29, closing it. When valve 29 closes, outlet valve 25 closes. After about 0.5 sec, signal S4 is shut off, and de-energizes the solenoid in valve 29, thus opening the valve and in turn re-opening liquid outlet valve 25. The period between de-energizing and re-energizing the solenoid is in the range from 0.1 sec but less than 1 sec.

Figure 6:
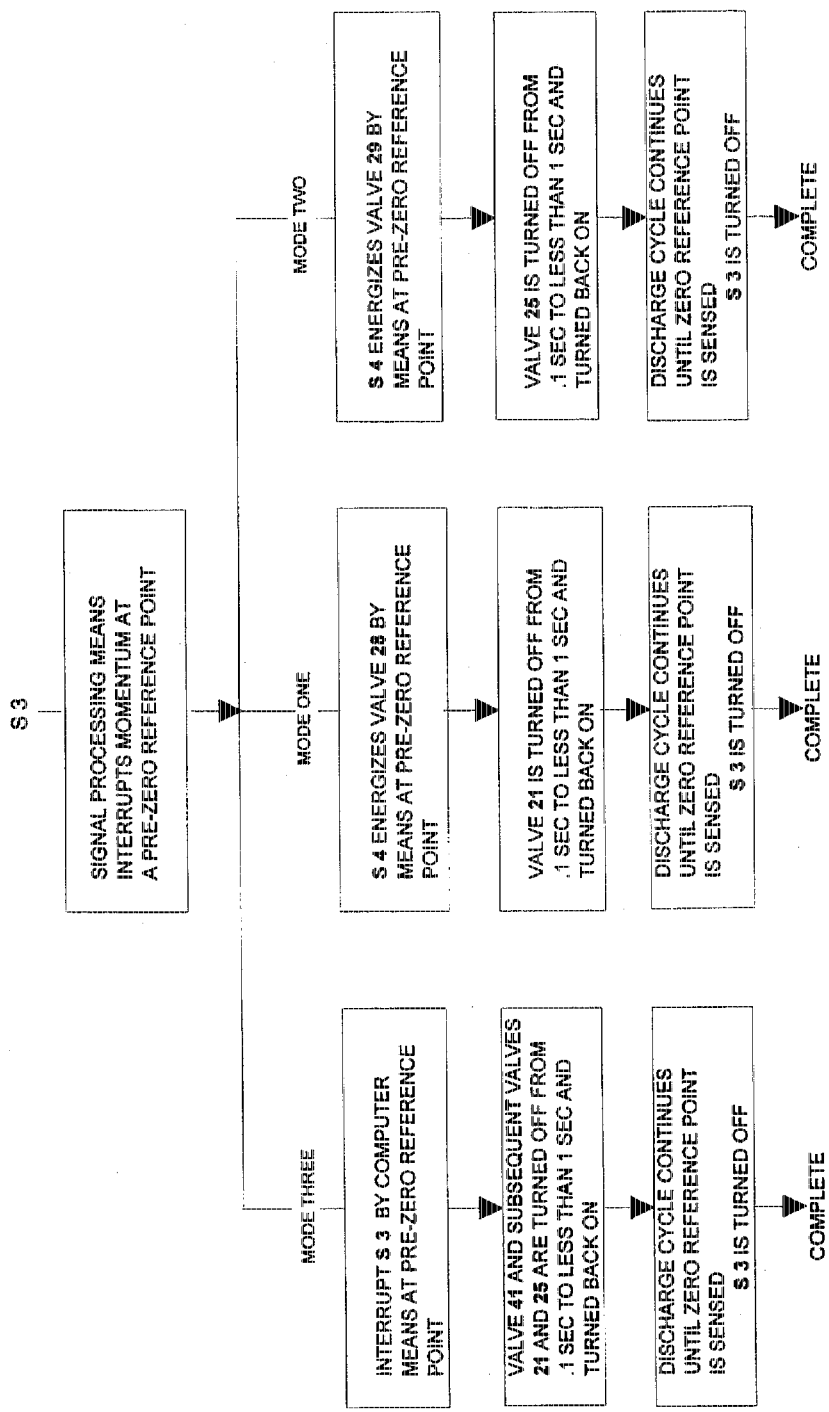
FIG. 6 is a functional flowsheet describing the operation of the signal processing (or "controller") means in each of two embodiments for interrupting the momentum of the mass of liquid being discharged from the dispenser.

A third embodiment for interrupting momentum, illustrated in FIG. 6 is as follows: As in embodiments one and two, when the load cell 15 senses the preset pre-zero reference point, valves 25 and 21 are in the open position, as are intermediate air valves 28 and 29. The programmed controller means shuts off signal S3 when it is informed that the pre-zero reference point is reached. This causes air pilot solenoid valve 41 to be de-energized, closing both valves 21 and 25. After about 0.5 sec, signal S3 is re-transmitted to energize the solenoid 41 and re-open both valves 21 and 45. The period between de-energizing and re-energizing the solenoid is in the range from 0.1 sec but less than 1 sec.

In each of the three embodiments above, after the momentum is interrupted at the pre-zero reference point, and discharge re-established, to restore a portion of the momentum of the liquid in the dispenser. When the zero reference point is reached, signal S3 is shut off, fully closing valves 21 and 25.

In specific detail, with respect to dispensing a single unit dose in particular, the dispensing system is calibrated for a zero reading at the "zero reference point", near the bottom of the plunger; a "charge reference point" near the top, where the difference represents a unit dose; and a "pre-zero reference point" at 85% of the unit dose being dispensed, just above the zero reference point.

To calibrate the system, whether the control of the manual override is provided for by the computer means or not, solenoid air pilot valve 35 is opened to energize the inlet valve 23 and charge liquid until the level in the sight glass 51 is at a mark identified as being the "zero line". The scale calibration is then manually inputted in the computer to recognize the zero line. More liquid is charged until the "unit dose fill" corresponding to a single unit dose, is charged. The unit dose is then discharged to the zero reference line, and the amount dispensed is weighed to determine the correlation between sensed weight (output signal in millivolts) and the weighed amount. A voltage input is set in the PC 45 corresponding to the decreased force after the unit dose is dispensed, is received in the dispenser. If multiple doses are to be dispensed, referred to as a "capacity fill", the dispenser is charged to a level in the sight glass corresponding to the total unit doses to be dispensed, provided that the level does not exceed the top of the plunger. To dispense multiple unit doses, the output signal will be directly proportional since all points between are linearly related. The charge reference point is also inputted in the computer to recognize the charge reference point. Having dispensed a unit dose, the voltage corresponding to the greater force exerted by the plunger is received by the PC which is then readied to start the discharge cycle.

Before starting the discharge cycle the computer automatically does an internal calibration check to determine if the desired amount charged is within a preset accuracy, for example ±3 percent. If outside the desired tolerance the computer goes into a "hold" mode, demanding manual attention. If within the desired tolerance, it commences the discharge cycle.

EXAMPLE 1

Effect of pressure on accuracy of discharge using a quick-acting valve with 0.5 sec lag time (takes 0.5 sec from before being fully closed after closing is initiated):

To determine the effect of discharging a unit dose without interrupting the flow prior to an outlet valve with 0.5 sec lag time being completely closed, the following illustrative computation is presented for the addition of a single unit dose of 473 ml (16 fl.oz.) of accelerator per sack of cement (45.5 Kg or 100 pounds), in a 7.65 m$^3$ (10 yd$^3$) batch of 6-sack concrete, that is, which contains six sacks of cement/yd$^3$ of concrete. The unit dose is 28.4 L (960 fl.oz., 7.5 gal) accelerator. The unit dose is discharged at a rate of 2.2 L/sec (73.8 fl.oz/sec) through a 1" nominal diameter pipe in open flow communication with a dispenser which is pressurized to about 380 kPa (40 psig or 54.7 psia) with air.

The elapsed time before the outlet valve begins to close includes the cumulative times for (i) the computer to process the instructions from the load cell, (ii) air to be vented from the solenoid in air control valve 41 before the solenoid closes, (iii) time for the air pressure to be transmitted to the outlet valve 25, and (iv) time for air to be vented from the outlet valve 25. In addition the actual closing time for the valve, after initiation, is 0.5 sec. The elapsed time typically totals about 0.8 sec. The amount of accelerator dispensed in 0.8 sec under the stated conditions is about 1.75 L (59 fl.oz.) which is outside the +3% limit (allowable +3% limit for 28.38 L is 851 ml). The excess dispensed in 0.8 sec is 893 ml.

To compensate for the unwanted excess, initiation of closing the outlet valve is signalled at a pre-zero reference point after 85% of the unit dose is discharged, which in a specific instance is 0.11 sec before the pre-set calibrated reference point for the unit dose is sensed by the load cell. This adjustment for 85% of the unit dose (which is the pre-zero reference point) is made in the PC 45 (or amplifier 43) taking into account the position of the calibrated zero reference point, because the volume % of discharged liquid cannot be set in the amplifier.

EXAMPLE 2

In a typical situation where a concrete truck is to be filled with a particular design mix of concrete, the truck is positioned to receive the required liquid ingredients for that particular design mix. The operator inputs the preloaded design mix and inputs the volume of the concrete batch contained in the truck. A charge cycle is automatically commenced as described hereinabove. Upon sensing the charge reference point near the top of the plunger, the load cell sends a signal to the amplifier 40 indicating the fill cycle is complete.

The discharge cycle does not commence automatically until all liquid ingredients are charged. When the discharge cycle does commence, the momentum is interrupted in each dispenser (since plural dispensers are typically used) after about 90% of a unit dose is discharged; and the discharge cycle is re-commenced until the entire unit dose is discharged.

In each of the following runs the stated accuracy of ±3% is achieved within a total cycle period of 50 sec or less, depending upon the size of the unit dose to be dispensed.

To dispense a small unit dose, e.g. 59 ml/sack (2 fl.oz/sack) of air entrainer in a 6-sack mix for a 7.65 m$^3$ (10 yd$^3$) batch, that is, 3.5 L (120 fl.oz) in 10 sec, using a dispenser having a diameter of 15 cm (5.9 in) and a volume of 9832 cm$^3$ (600 in$^3$) with a plunger having a diameter of 4.13 cm (1.625 in), the excess liquid which would flow through an outlet valve with a 0.5 sec lag time and 0.8 sec total elapsed time is 218 ml (7.4 fl.oz.) By interrupting the discharge when 3193 ml (108 fl.oz) has been dispensed, the unit dose dispensed falls within the 106 ml (3.6 fl.oz) tolerance.

To dispense a large unit dose, e.g. 1794 ml/sack (60 fl.oz/sack) of accelerator in a 6-sack mix for a 7.65 m$^3$ (10 yd$^3$) batch, that is, 106 L (3600 fl.oz) in 40 sec, using a dispenser having a diameter of 12 in and a volume of 88490 cm$^3$ (5400 in$^3$) with a plunger having a diameter of 5.1 cm (2 in), the excess liquid which would flow through an outlet valve with a 0.5 sec lag time and 0.8 sec total elapsed time is 6.5 L (221 fl.oz) which is 3.34 L (113 fl.oz) over tolerance. By interrupting the discharge when 95.8 L (3240 fl.oz) has been dispensed, the unit dose dispensed falls within the 3.19 L (108 fl.oz) tolerance.

EXAMPLE 3

Prior art dispenser using a digital displacement meter:

The particular meter used herein is a Model PFT-25 Concrete Additive Flow Transmission System meter made by Badger Meter, Inc. The meter functions as a mass flow meter to charge a dispenser operating in the "single unit dose" mode. The meter is used in combination with a computer which reads 10 counts/sec. This meter is used to measure a unit dose into a dispenser before the unit dose is discharged to a concrete track because the unit dose must be verified before being discharged into the track. The dispenser is equipped with a pair of probes, first and second (rods) positioned vertically in spaced apart relationship, the bottom of the first probe being slightly higher from the bottom of the dispenser than the bottom of the second probe. A computer is connected to respond to the liquid level leaving the first probe, and then the second. A unit dose is dispensed when the liquid level leaves the second probe.

The meter has a maximum count rate of 10 counts/sec to match the computer's capability, and each count corresponds to 29.6 ml (1 fl.oz) so that to charge a unit dose of 23.7 L (800 fl.oz, 6.25 gal) into a dispenser it takes 80 sec. Ignoring that the charge portion of the cycle is greater than 1 min, and seeking to discharge the unit dose in 20 sec, under an air pressure of 380 kPa (40 psig), the discharge is continued until the level of liquid drops beneath a probe. When the probe is no longer in contact with liquid, the outlet valve is shut off. The bottom of the probe is positioned so as to compensate for the 0.5 sec lag time to close a quick-acting outlet valve. Since the counts/sec for the meter must be readable by a computer, even if the computer was able to read 15 counts/sec it is evident that a total cycle time of 1 min will not be met.

Moreover, at the end of a discharge cycle, one does not know the actual volume of the liquid in the dispenser since the level could have dropped to varying levels below the probe. Thus, though the meter might accurately charge a unit dose, the amount of the unit dose was uncontrolled, since the probe could only sense when the liquid level fell beneath it.

Having thus provided a general discussion, described the overall method in detail and illustrated the invention with specific examples of the best mode of carrying out the method, it will be evident that the invention has provided a long-felt need specifically in the concrete making field. It is therefore to be understood that no undue restrictions are to be imposed by reason of the specific embodiments illustrated and discussed, and particularly that the invention is not restricted to a slavish adherence to the details set forth herein.

I claim:

1. In a method for dispensing a unit dose of liquid from a dispenser in a system comprising a liquid outlet valve means through which liquid is to be dispensed, a gas inlet valve means through which pressurizing gas is led into said dispenser, an elongated plunger partially immersed in said liquid, said plunger having a specific gravity greater than said liquid and a length greater than a range in said dispenser over which range said liquid level varies, and controller means to receive signals generated in a load cell which continuously senses the apparent weight of said plunger, and said controller means transmits instructions to said valve means, the improvement which comprises, (a) opening said outlet valve means to commence dispensing said unit dose,
   (b) opening an air inlet valve means to flow pressurizing air into said dispenser to maintain a superatmospheric pressure up to about 790 kPa (100 psig),
   (c) receiving a first signal in said controller means, said first signal being proportional to the sensed weight of said plunger when a pre-zero reference point is sensed after a major portion of said unit dose is dispensed,
   (d) transmitting a first output signal from said controller means to at least one of said gas inlet valve means and said liquid outlet valve means to interrupt momentum of said liquid in said dispenser,
   (e) restoring a portion of said momentum,
   (f) receiving a second signal in said controller means, said second signal corresponding to the sensed weight of said plunger when a zero reference point is sensed, and thereafter,
   (g) transmitting a second output signal to close said outlet valve means in less than 1 second;
   whereby said unit dose ±5 percent is adapted to be dispensed within a predetermined portion of time, without measuring the level or the volume of liquid contained in said dispenser, or directly weighing said liquid dispensed therefrom.

2. The method of claim 1 wherein said momentum is interrupted by closing said air inlet valve means when said pre-zero reference point is sensed, and re-opening said air inlet valve means within 1 second,
   maintaining said outlet valve means in an open position, and,
   closing said outlet valve means within less than 1 second when said zero reference point is sensed.

3. The method of claim 1 wherein said momentum is interrupted by maintaining said air inlet valve means in an open position to keep said dispenser pressurized,
   closing said outlet valve means when said pre-zero reference point is sensed, and re-opening said outlet valve means within 1 second, and,
   closing said outlet valve means within less than 1 second when said zero reference point is sensed.

4. The method of claim 1 wherein said momentum is interrupted by closing said air inlet valve means when said pre-zero reference point is sensed, and re-opening said air inlet valve means within 1 second, and essentially simultaneously
   closing said outlet valve means when said pre-zero reference point is sensed, and re-opening said outlet valve means within 1 second, and,
   closing said outlet valve means within less than 1 second when said zero reference point is sensed.

5. The method of claim 1 wherein said predetermined time for dispensing a unit dose is less than 2 minutes.

6. The method of claim 5 wherein each said valve means open or close in less than 1 sec.

7. The method of claim 5 wherein said portion of said momentum is restored within less than 1 second, said predetermined time for dispensing a unit dose is less than 1 minute, each said valve means open or close in less than 1 sec, and said unit dose is dispensed with ±3 percent accuracy.

8. In a system for dispensing a unit dose of liquid from a dispenser comprising a liquid outlet valve means through which liquid is to be dispensed, a gas inlet valve means through which pressurizing gas is led into said dispenser, an elongated plunger partially immersed in said liquid, said plunger having a specific gravity greater than said liquid and a length greater than the variation of liquid level in said dispenser, and controller means to receive signals generated in a load cell which continuously senses the apparent weight of said plunger, and said controller means transmits instructions to said valves, the improvement comprising, (a) means for opening said outlet valve means to commence dispensing said unit dose, (b) means for opening an air inlet valve means to flow pressurizing air into said dispenser to maintain a super-atmospheric pressure up to about 790 kPa (100 psig), (c) load cell means for generating a first signal proportional to the sensed weight of said plunger when a pre-zero reference point is sensed after a major portion of said unit dose is dispensed, (d) means for receiving said first signal in said controller means and transmitting a first output signal from said controller means to at least one of said gas inlet valve means and said liquid outlet valve means to interrupt momentum of said liquid in said dispenser for a preselected period, (e) means for restoring a portion of said momentum, and, (f) means for receiving a second signal in said controller means, said second signal corresponding to the sensed weight of said plunger when a zero reference point is sensed, and, (g) means for transmitting a second output signal to close said outlet valve means in less than 1 second;

whereby said unit dose ±5 percent is adapted to be charged and dispensed within a predetermined cycle time without measuring the level or the volume of liquid contained in said dispenser, or directly weighing said liquid dispensed therefrom.

9. The system of claim 8 wherein said single unit dose of said liquid is in the range from about one-third (0.3 L) liter or 10 fl.oz, to about one hundred thirteen liters (113 L) or 30 gal.

10. The system of claim 8 wherein said dispenser and said plunger have cross-sectional areas in a ratio in the range from about 3 to 20.

11. The system of claim 8 wherein said dispenser has an internal cross-sectional area in the range from about 176 cm$^2$ to about 761 cm$^2$.

12. The system of claim 8 wherein said first output signal from said controller means to at least one of said gas inlet valve means and said liquid outlet valve means interrupts momentum of said liquid for a preselected period in the range from about 0.25 sec to about 1 sec.

13. The system of claim 9 wherein said unit dose is dispensed into a batch of wet concrete mix, and said liquid is a reaction-modifying liquid which modifies the rate at which said concrete mix sets up.

14. The system of claim 8 wherein said liquid is selected from the group consisting of an accelerator, a retarder, an air entrainer, and a water reducer.

15. The system of claim 9 wherein said load cell has a resolution in the range from about 0.00045 kg (0.001 lb) to about 0.00225 kg (0.005 lb).

16. The system of claim 9 wherein said portion of said momentum is restored within less than 1 second, said predetermined time for dispensing a unit dose is less than 1 minute, said valve means open or close in less than 1 sec, and said unit dose is dispensed with ±3 percent accuracy.

17. In a system for charging a dispenser and dispensing a unit dose of liquid therefrom in a discharge portion of a fill-and-discharge cycle of defined duration, without directly measuring the weight of anything, or the volume the level of the liquid in the dispenser which is charged with the liquid from a supply reservoir through a liquid inlet valve means, and discharged through an outlet valve means, said system including a controller means to receive signals generated in a load cell means from which is suspended an elongated plunger which is partially immersed in said liquid, the improvement which comprises, (i) gas inlet valve means to control flow of pressurizing gas to said dispenser, said gas inlet valve means being quick-acting so as to open or close in less than 1 sec., responsive to output signals from said controller means, (ii) said liquid inlet and outlet valve means are each quick-acting so as to open or close in less than 1 sec., and responsive to output signals from said controller means, and, (iii) said load cell produces a signal which varies in response to the amount of liquid in said dispenser corresponding to a charge reference point, a zero reference point, and a pre-zero reference point, respectively, said charge reference point indicating said discharge portion is to be initiated and the availability of at least one unit dose, said zero reference point indicating that a unit dose has been dispensed, and said pre-zero reference point indicating that a major portion of said unit dose has been dispensed, and, (iv) said controller means is adapted to transmit a first output signal to interrupt the momentum of said liquid flowing through said dispenser when said pre-zero reference point is sensed and to restore a portion of said momentum within less than 1 second, and, to transmit a second output signal closing said outlet valve means when said zero reference point is sensed, whereby said unit dose ±5 percent is adapted to be charged and dispensed within 2 minutes.

18. The system of claim 17 wherein said portion of said momentum is restored within less than 0.5 second, said discharge portion of said fill-and-discharge cycle is less than 1 minute, said valve means open or close in less than 0.5 sec, and said unit dose is dispensed with ±3 percent accuracy.

* * * * *